United States Patent [19]
Kyoukane et al.

[11] Patent Number: 5,150,034
[45] Date of Patent: Sep. 22, 1992

[54] AUTOMATICALLY CHARGING SYSTEM FOR ELECTRIC AUTOMOBILE

[75] Inventors: Yasuaki Kyoukane; Toshihiro Nagano, both of Omiya, Japan

[73] Assignee: Fuji Jukogyo Kabushiki Kaisha, Tokyo, Japan

[21] Appl. No.: 602,146

[22] Filed: Oct. 24, 1990

[30] Foreign Application Priority Data

Oct. 25, 1989 [JP] Japan .................................. 1-279108

[51] Int. Cl.$^5$ .......................................... H01L 41/08
[52] U.S. Cl. ...................................... 320/62; 180/65.2
[58] Field of Search ...................... 320/62; 100/65.2

[56] References Cited

U.S. PATENT DOCUMENTS

| | | | |
|---|---|---|---|
| 3,792,327 | 2/1974 | Waldorf | 320/62 |
| 4,021,677 | 5/1977 | Rosen et al. | 100/65.2 |
| 4,042,056 | 8/1977 | Horwinski | 180/65.2 |
| 4,090,577 | 5/1978 | Moore | 100/65.2 |
| 4,477,764 | 10/1984 | Pollard | 320/62 |
| 4,593,779 | 6/1986 | Krahling | 320/62 |
| 4,629,968 | 12/1986 | Butts et al. | 320/62 |
| 4,713,964 | 12/1987 | Ioannides | 356/439 |
| 4,888,702 | 12/1989 | Gerken et al. | 320/62 |

FOREIGN PATENT DOCUMENTS

2126179 3/1984 United Kingdom ............... 180/65.2

OTHER PUBLICATIONS

"Design Considerations for a Near-Term Hybrid Vehicle", by R. Schwarz, IECEC (Conference), Aug. 18–22, 1980.

*Primary Examiner*—Steven L. Stephan
*Assistant Examiner*—Thomas M. Dougherty
*Attorney, Agent, or Firm*—Beveridge, DeGrandi & Weilacher

[57] ABSTRACT

An automatically charging system for an electric automobile calculates a terminal voltage of a battery and an output signal from a lux sensor is compared with a preliminarily set reference illumination to discriminate whether the automobile is indoors or outdoors. The terminal voltage is compared with preliminarily set lower and upper limit voltage. When the terminal voltage is lower than the lower limit voltage and when it is discriminated that the automobile is outdoors, it is discriminated that the engine starting condition is established. On the other hand, when it is discriminated that the automobile is indoors or when the terminal voltage is higher than the upper limit voltage, it is discriminated that the engine stopping condition is established. When the engine is started, the generator is automatically started and when the engine is stopping, the generator is automatically stopped.

5 Claims, 3 Drawing Sheets

AUTOMATICALLY CHARGING SYSTEM FOR ELECTRIC AUTOMOBILE

BACKGROUND OF THE INVENTION

The present invention relates to an automatic charging system for an electric motor vehicle, particularly to the system for discriminating the start-stop condition of an engine mounted on the vehicle and for driving a generator connected to the engine as an auxiliary power source of an electric motor depending on a terminal voltage of a battery and on an illumination intensity of lights.

Recently, attention has been paid to electric automobiles as a new type of a transportation system which do not cause environmental pollution and noise pollution. However, a conventional electric automobile involves problems of long electrical charging time and short traveling distance per one charge of the battery. To mount a battery of large capacity in order to lengthen the travelling distance greatly increases the weight of the automobile and also requires a large space for the battery.

In order to eliminate these defects, a hybrid system in which an engine and the battery are mounted on the automobile has been widely adapted. Such a hybrid system includes a serial hybrid system in which an output of the engine is once converted to an electric energy to drive the electric motor as disclosed, for example, in the Japanese Patent Laid-open Publication No. 55-157901 and a parallel hybrid system in which an output shaft of the engine is connected to the electric motor and a driving mechanism being capable of driving the automobile by either one of the engine or motor as disclosed, for example, in Japanese Patent Laid-open Publication No. 59-63901.

Both the types of serial and parallel hybrid systems involve both advantages and disadvantages.

Thus, for example, the serial hybrid system is superior in low fuel consumption and low environmental pollution because of a suitable steady speed operation regardless of variation of load. Automatic charging of an electric automobile of a serial hybrid system is controlled by detecting only the terminal voltage of the battery and by starting the engine when the terminal voltage falls below a certain constant value and automatically stopping the engine when the terminal voltage increases to a predetermined value.

As described hereinbefore, in view of the characteristic features of the electric automobile which causes no environmental pollution and causes only low noise, the indoor use of the electric automobile as a carrying vehicle has been widely considered. However, the indoor use of the engine may contaminate the indoor environment by engine exhaust gas and is not desirable from the viewpoint of noise. Frequent stopping of the engine operation for avoiding the above problems make the re-starting operation of the engine complicated and causes erroneous operation of the automobile.

SUMMARY OF THE INVENTION

An object of the present invention is to substantially eliminate the defects or drawbacks encountered in the prior art and to provide an automatic charging system for an electric automobile capable of automatically starting and stopping an engine of the automobile by discriminating the environmental condition with an improved maneuverability and with substantially no environmental pollution during the indoor operation of the automobile.

This and other objects can be achieved according to the present invention by providing an automatic charging system for an electric automobile equipped with an engine, a generator, an electric motor and a battery, the charging system comprising a lux sensor for detecting environmental illumination, a sensor for detecting a terminal voltage of the battery, a discriminating section for comparing an output signal from the lux sensor with a preliminarily set indoor-outdoor discriminating reference illumination to discriminate whether an automobile is indoors or outdoors, a determining section responsive to the terminal voltage and the discrimination results of the discriminating means for determining an engine start-stop condition, and a starting and stopping section operated in accordance with the determination result of the determination section.

The determining section compares the terminal voltage of the battery with a preliminarily set lower limit voltage and determines that an engine starting condition is established when the terminal voltage is lower than the lower limit voltage and the discriminating section discriminates that the automobile is indoors.

The determining section also compares the terminal voltage of the battery with a preliminarily set upper limit voltage and determines that an engine stopping condition is established when the terminal voltage is higher than the upper limit voltage.

The determining section determines that an engine stopping condition is established when the discriminating section discriminates that the automobile is outdoors.

The starting and stopping section operates to start driving the engine upon the determination of the engine starting condition established by the determining section and to stop driving the engine under the determination of the engine stopping condition established by the determining section.

According to the automatic charging system for the electric automobile of the character described above, the terminal voltage of the battery is first detected and the output signal from the lux sensor is compared with the preliminarily set reference illumination, whereby it is discriminated that the automobile is now indoors or outdoors.

In the next step, the terminal voltage is compared with the preliminarily set lower and the upper limit voltage. When the terminal voltage is lower than the lower limit voltage and when the discriminating section discriminates that the automobile is in the outdoors, it is discriminated that the engine starting condition is established. On the other hand, when the discriminating section discriminates that the automobile is indoor or when the terminal voltage is higher than the upper limit voltage, it is discriminated that the engine stopping condition is established.

In a case when it is discriminated that the engine starting condition is established, the engine operatively connected to the generator is automatically started and when it is discriminated that the engine stopping condition is established, the engine is automatically stopped.

BRIEF DESCRIPTION OF THE DRAWINGS

For a better understanding of the present invention and to show how the same is carried out, reference is made, by way of preferred embodiment, to the accompanying drawings, in which.

DESCRIPTION OF THE PREFERRED EMBODIMENT

A preferred embodiment of the present invention will become understood from the following detailed description referring to the accompanying drawings.

Figure 1:
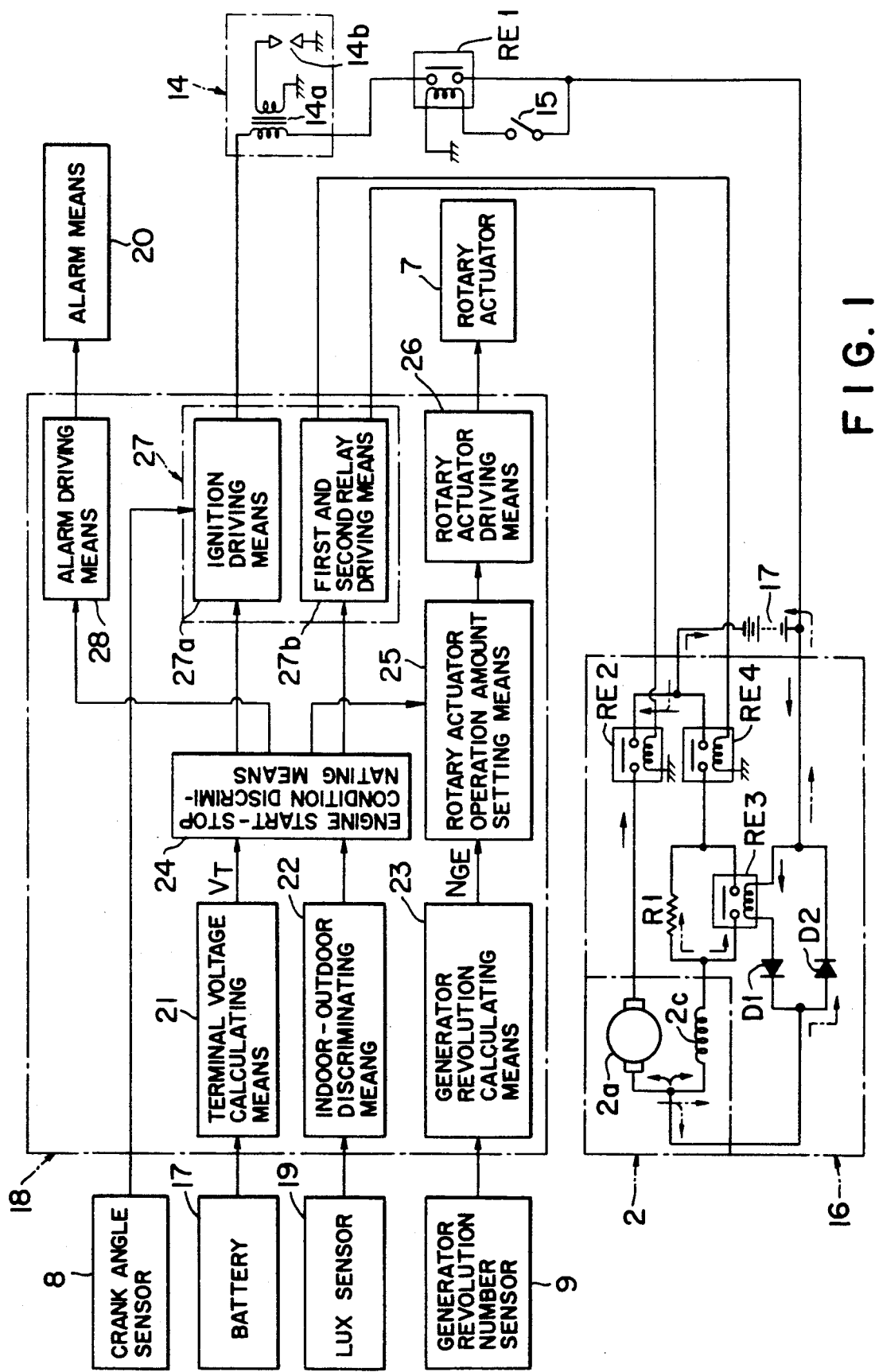
FIG. 1 is a schematic diagram representing functions of an automatically charging system for an electric automobile according to the present invention.
Figure 2:
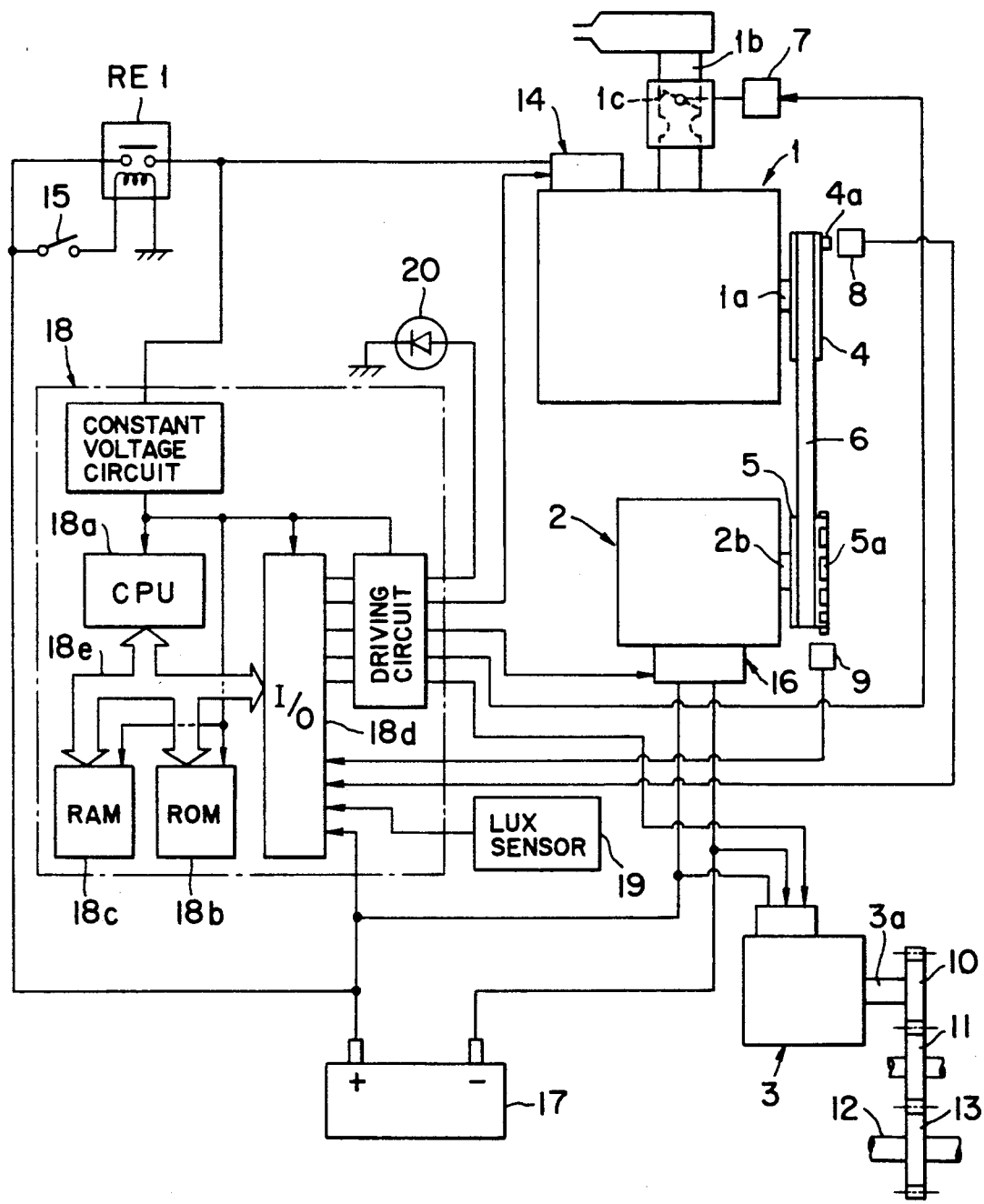
FIG. 2 is a schematic diagram representing a control unit of the automatically charging system shown in FIG. 1.

Referring to FIGS. 1 and 2, an engine 1, a generator 2 and an electric motor 3 are mounted to a frame of an electric automobile, not shown.

A drive pulley 4 mounted on an output shaft 1a of the engine 1 is operatively connected through a belt 6 to a driven pulley 5 mounted to an input shaft 2b connected to an electric armature 2a of the generator 2. The engine 1 is provided with an intake pipe 1b mounting a throttle valve 1c which is operatively connected to a rotary actuator 7. The drive pulley 4 is provided with a projection 4a indicating an ignition timing and a crank angle sensor 8 for detecting the projection 4a is opposed to the projection 4a. The driven pulley 5 is provided with a projection or slit 5a formed to the outer periphery of the driven pulley 5 and a sensor 9 for detecting a revolution number of the generator 2 is opposed to the projection or slit 5a.

A drive gear 10 mounted to an output shaft 3a of the motor 3 is operatively connected to a driven gear 13 mounted to a driving shaft 12 of the electric automobile, not shown, through an idler gear 11.

The engine 1 is equipped with an ignition circuit 14 comprising, as shown in FIG. 1, an ignition coil 14a and an ignition plug 14b connected to the secondary side of the ignition coil 14a. The primary side of the ignition coil 14a is connected to a plus terminal of a battery 17 through a normally open contact of a control relay RE1. The control relay RE1 includes an exciter coil to which the positive terminal of the battery 17 is connected through a key switch 15.

The generator 2 is controlled by a generator control circuit 16. A normally open contact of a first relay RE2 of the generator control circuit 16 is connected to the armature 2a of the generator 2. A field winding 2c of the generator 2 is connected to a normally open contact of a second relay RE4 through a normally open contact of a resistor R1 and a change-over relay RE3 which are arranged in parallel. The second relay RE4 is connected to the first relay RE2.

The change-over relay RE3 includes an exciter coil to which an anode side of a diode D1 is connected. A cathode side of the diode D1 is connected to an anode side of another diode D2 and a cathode side of the diode D2 is connected to the exciting coil of the change-over relay RE3.

A portion of a connection line of the cathode side of the diode D1 and the anode side of the diode D2 is connected to a portion of a connection line of the armature 2a and the field winding 2c of the generator 2. A portion of a connection line of the cathode side of the diode D2 and the exciting coil of the change-over relay RE3 is connected to the positive terminal of the battery 17. A contacting point of the normally open contact of the first relay RE2 and the normally open contact of the second relay RE4 is connected to a negative terminal of the battery 17.

A circuit arrangement of a control unit 18 including a microcomputer shown in FIG. 2 will be described hereunder.

The microcomputer of the control unit 18 comprises, as shown in FIG. 2, a central processing unit (CPU) 18a, a read only memory (ROM) 18b, a random access memory (RAM) 18c and a I/O interface 18d which are connected through a bus line 18e with each other.

The I/O interface 18d is provided with an input port to which are connected the crank angle sensor 8, the generator revolution number sensor 9 and the positive terminal of the battery 17 and a lux sensor 19 arranged at an upper portion of the electric automobile for detecting amount or dosage of environmental ultraviolet ray or illumination, such as light, is further connected to the input port of the I/O interface 18d.

The I/O interface 18d is also provided with an output port to which are connected an alarm means 20 such as a light emitting diode (LED), the primary side of the ignition circuit 14a constituting the ignition circuit 14, the rotary actuator 7 and the exciter coil of the first and second relays RE2 and RE4 constituting the generator controlling circuit 16.

Stationary data such as control program and various comparative reference values are stored in the ROM 18b. Data processing the output signals from the respective sensors are stored in the RAM 18c. The CPU 18a discriminates operation calculation of the rotary actuator 7, ignition timing setting and ignition cutting in dependency on the respective data.

As shown in FIG. 1, the control unit 18 comprises terminal voltage calculating means 21, indoor-outdoor discriminating means 22, generator revolution number calculating means 23, engine start-stop condition discriminating means 24, rotary actuator operation amount setting means 25, rotary actuator driving means 26, engine operation stopping means 27, and alarm driving means 28. The engine operation sopping means 27 includes ignition driving means 27a and first and second relay driving means 27b.

The terminal voltage calculation means 21 calculates the terminal voltage VT of the battery 17 in accordance with the voltage of the battery 17.

The indoor-outdoor discriminating means 22 compares an illumination L detected by the lux sensor 19 with a reference illumination Ls preliminarily set, and in case of $L < Ls$, it is discriminated that the automobile is now at a darkened location, e.g. indoors, and in case of $L \geq Ls$, it is discriminated that the automobile is now outdoors.

The generator revolution number calculating means 23 calculates the generator revolution number NGE in response to the output signal from the generator revolution number sensor 9.

The engine start-stop operation condition discriminating means 24 compares the terminal voltage VT calculated by the terminal voltage calculating means 21 with a voltage lower limit value discriminating reference voltage VI (1V, for example) and a voltage upper limit value discriminating reference voltage VH. In case of $VT < VI$ and $L \geq Ls$, it is discriminated that the engine start condition is established and in case of $L < Ls$ or $VT \geq VH$, it is discriminated that the engine stop condition is established.

The rotary actuator operation amount setting means 25 calculates, upon the condition of the engine start condition establishment of the engine start-stop operation discriminating means 24, the operation amount of the rotary actuator 7 from the deviation between the generator revolution number NGE calculated by the generator revolution number calculating means 23 and a preliminarily set generator revolution number NGEO. The operation amount may be set in accordance with map index operation. In a case where it is discriminated by the engine start-stop operation condition discriminating means 24 that the engine stop condition is established, the operation of the rotary actuator 7 stops.

The rotary actuator driving means 26 operates to output an operation signal corresponding to the operation amount of the rotary actuator set by the rotary actuator operation amount setting means 25 to the rotary actuator 7. In response to the described operation, the rotary actuator 7 operates to open or close the throttle valve 1c so as to minutely control the engine speed and thereby amend or correct the speed variation in response to the engine load or the revolution number variation of the generator 2 due to slipping of the drive pulley 4, for example.

The first and second relay driving means 27b operates to pass electric current to the exciter coils of the first and second relays RE2 and RE4 arranged in the generator control circuit 16 upon the discrimination of the engine start operation condition established by the engine start-stop operation condition discriminating means 24. In response to this operation, the first and second relays RE2 and RE4 are made "ON" and discharge current from the battery 17 then flows, as shown by solid arrows in FIG. 1, in the diode D1 through the exciting coil of the change-over relay RE3, whereby the change-over relay RE3 is made "ON" and the normally open contact is closed to establish a starter circuit. Thus, the current flows in the armature 2a of the generator 2 and the field winding 2c without passing through the resistor R1. As the result, the generator 2 is operated to rotate in accordance with the current passing the field winding 2c and, hence, the engine 1 is driven by the driving of the generator 2 through the belt 6.

When the engine 1 starts and the operation speed thereof increases, the current in the starter circuit gradually decreases, finally to zero value, and the change-over relay RE3 is made "OFF".

When the engine speed increases further, an electromotive force is generated from the armature 2a of the generator 2 and the currents thereof flow as shown by dotted arrows to thereby excite the field winding 2a in one flow and to charge the battery 17 through the diode D2 in the other flow.

The first and second relay driving means 27b operate to turn "OFF" the first and second relays RE2 and RE4 of the generator control circuit 16 to stop the charge or discharge of the battery with respect to the generator 2 upon the discrimination of the engine stop condition established by the engine start-stop operation condition discriminating means 24.

Figure 3:
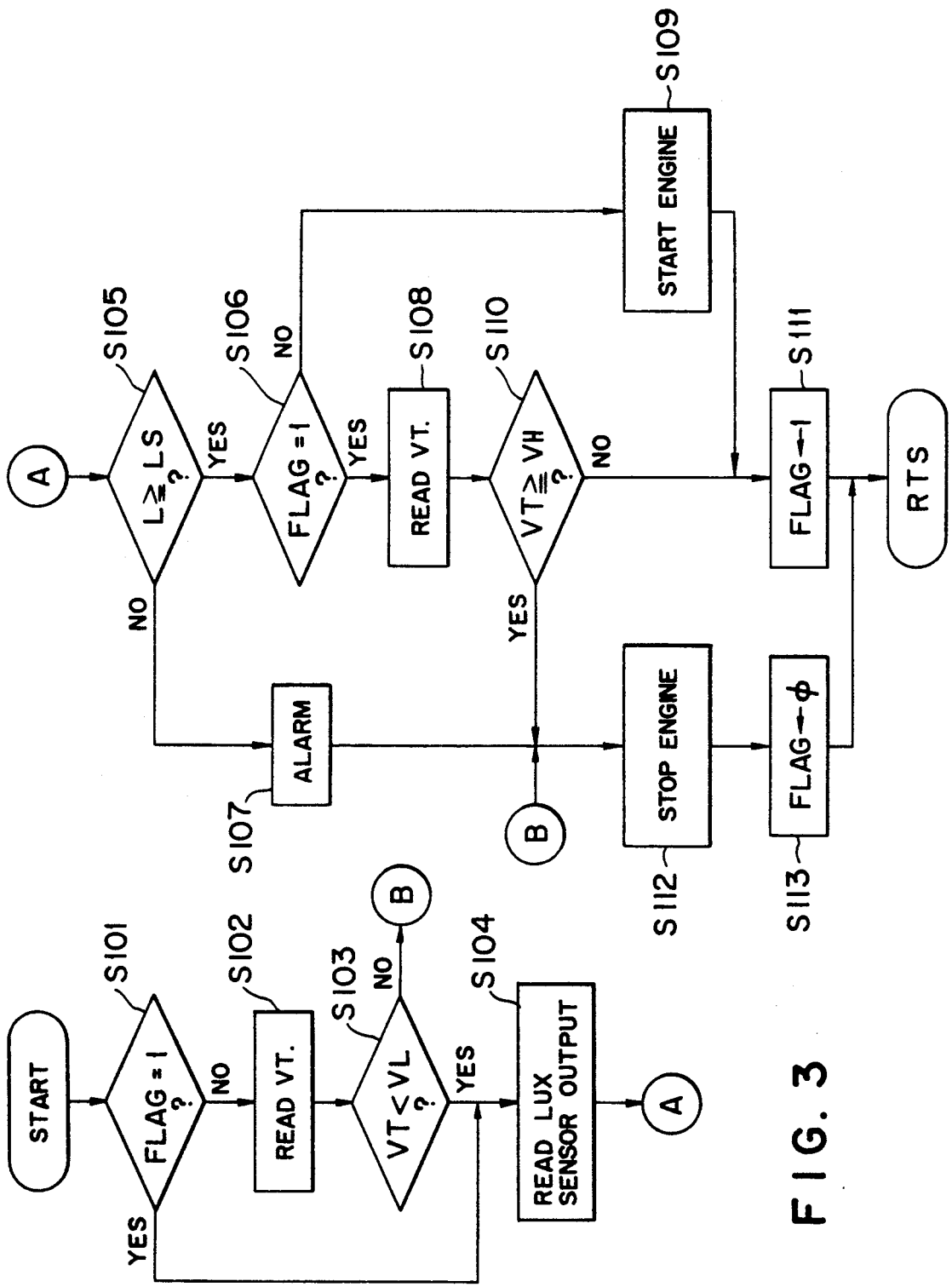
FIG. 3 is a flowchart representing engine start-stop operation control.

The control of the automatically charging system of the structure described above will be described hereunder in conjunction with the flowchart of FIG. 3.

First, in a step S101, it is discriminated as to whether an engine condition discrimination flag is FLAG = 1 or not. In case of FLAG = 1, the engine is now being operated (charged) and, hence, the step jumps to a step S104.

In case of FLAG = Φ, the engine operation is now stopped and, hence, the control advances to a step S102 to read the terminal voltage VT of the battery 17.

In a step S103, the terminal voltage VT read in the step S102 is compared with the preliminarily set voltage lower limit value discriminating reference voltage VL (11V, for example). In case of VT ≧ VL, it is discriminated that the battery 17 is sufficiently charged, and the control jumps to a step S112. On the contrary, in case of VT < VL, it is discriminated that the battery charged amount is less than the allowable value, and the control advances to the step S104, in which the output value L of the lux sensor 19 is read. In a next step S105, the output value L read in the step S104 is compared with the preliminarily set indoor-outdoor discriminating reference illumination Ls. In case of L ≧ Ls, it is discriminated to be outdoors and the control advances to a step S106 and in case of L < Ls, it is discriminated to be indoors and the control advances to a step S107.

In the step S106, it is discriminated whether the engine condition discriminating flag is FLAG = 1 or not. In case of FLAG = 1, the control advances to a step S108 and in case of FLAG = Φ, the control advances to a step S109.

In the step S108, the terminal voltage VT of the battery 17 is read, and in a step S110, the terminal voltage VT is compared with the preliminarily set voltage upper limit value discriminating reference voltage VH (15V, for example). In this comparison, in case of VT < VH, the control advances to a step S111 because of the insufficient charge of the battery 17 and the engine condition discriminating flag is set to FLAG = 1 (FLAG ← 1) and the control is then out of routine. In case of VT ≧ VH, i.e. when it is discriminated that the battery 17 is sufficiently charged, the control jumps to the step S112.

In the step S106, when it is discriminated that the engine condition discriminating flag is FLAG = Φ, i.e. that the engine operation is now stopped, the control advances to the step S109, in which the ignition operation starts to start the engine and the rotary actuator 7 is operated to adjust the degree of opening of the throttle valve 7c. After the first and second relays RE2 and RE4 has been made "ON", the control advances to the step S111.

On the contrary, in the step S105, in case of the discrimination of L < Ls, i.e. when it is discriminated to be indoors, the control advances to the step S107, operating the engine is inhibited. Accordingly, an LED as one example of the alarm means 20 is lit to generate an alarm to inform an operator of the insufficient charge condition. In the step S112, the ignition unit is cut to stop the engine operation and further stop the operation of the rotary actuator 7. The first and second relays RE2 and RE4 are made "OFF". In a step S113, the engine condition discriminating flag is made clear (FLAG ← 1) and the control is thereafter out of the routine.

As described hereinabove, in the indoor driving of the electric automobile, the engine is automatically stopped to thereby stop the charging operation of the battery 17. Accordingly, the charging operation is carried out only for outdoor driving of the electric automobile, so that the stable indoor conditions can be effectively maintained. In addition, the insufficient charged condition can be communicated to the indoor operator, so that the rapid stopping of the travelling of the electric automobile can be eliminated.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An automatic charging system for an electric automobile provided with an engine, a generator, an electric motor and a battery, comprising:

first detecting means for detecting an environmental illumination and producing an output signal representing an amount of said illumination;

second detecting means for detecting a terminal voltage of the battery;

discriminating means with a preliminarily set predetermined value of reference illumination and for comparing said output signal from said first detecting means with said predetermined value to produce discrimination results;

engine start-stop condition determining means for determining an engine start-stop condition based on said terminal voltage and results of said discriminating means; and starting and stopping means for starting and stopping engine operation in accordance with a determination results of said determining means.

2. The automatic charging system according to claim 1, wherein said engine start-stop condition determining means is adapted to compare the terminal voltage of the battery with a preliminarily set lower limit voltage and to determine that an engine starting condition is established when the terminal voltage is lower than the lower limit voltage and said discriminating means discriminates that said output signal from said first detecting means is lower than said predetermined value.

3. The automatic charging system according to claim 1, wherein said engine start-stop condition determining means is adapted to compare the terminal voltage of the battery with a preliminarily set upper limit voltage and to determine that an engine stopping condition is established when the terminal voltage is higher than the upper limit voltage.

4. The automatic charging system according to claim 1, wherein said engine start-stop condition determining means is adapted to determine that an engine stopping condition is established when said discriminating means discriminates that said output signal from said first detecting means is higher than said predetermined value.

5. The automatic charging system according to claim 1, wherein said starting and stopping means is adapted to start driving the engine under the determination of the engine starting condition establishment of said determining means and to stop driving the engine upon the determination of the engine stopping condition establishment of said determining means.

* * * * *